United States Patent [19]

Ellis et al.

[11] 4,308,041
[45] Dec. 29, 1981

[54] AIR FILTER CARTRIDGE

[75] Inventors: Jerry R. Ellis, Cazenovia; John A. Taddeo, Clay, both of N.Y.

[73] Assignee: Cambridge Filter Corp., Syracuse, N.Y.

[21] Appl. No.: 232,466

[22] Filed: Feb. 9, 1981

[51] Int. Cl.³ .............................................. B01D 46/10
[52] U.S. Cl. .......................................... 55/510; 55/351; 55/400; 55/514; 55/517; 360/97; 55/385 E
[58] Field of Search ................. 55/400, 351, 495, 497, 55/498, 499, 500, 502, 503, 385 E, 510, 511, 514, 517, 467, 471, 472, 473; 360/97; 210/456, 360.1, 360.2, 402–404

[56] References Cited

U.S. PATENT DOCUMENTS 3,688,289  8/1972  Schnell et al. ......................... 55/400
3,710,377  1/1973  Buslik ..................................... 360/97

FOREIGN PATENT DOCUMENTS 2446121  8/1980  France .................................. 55/498
52-4214  1/1977  Japan .................................... 360/97

Primary Examiner—Bernard Nozick
Attorney, Agent, or Firm—Charles S. McGuire

[57] ABSTRACT

A cartridge including a sheet of filtering media in annular form through which air is passed as it moves in a generally toroidal path within an enclosed housing due to rotation of a computer tape disc, or the like, mounted adjacent the cartridge within the housing. The cartridge includes a rigid body portion supporting the filter media in a generally conical plane within the annular body. The body portion is initially formed as two separate, mating halves which engage the media about its inner and outer peripheries when joined.

5 Claims, 4 Drawing Figures

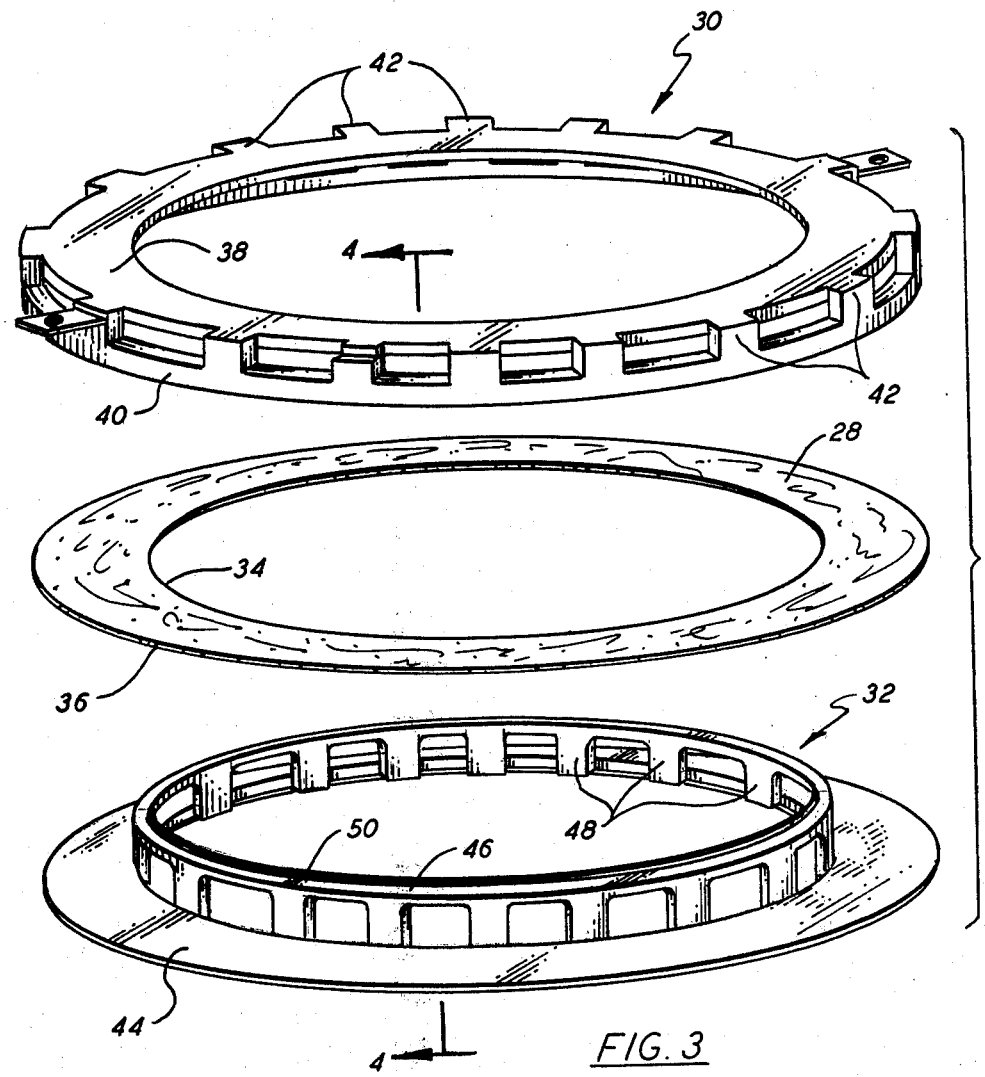
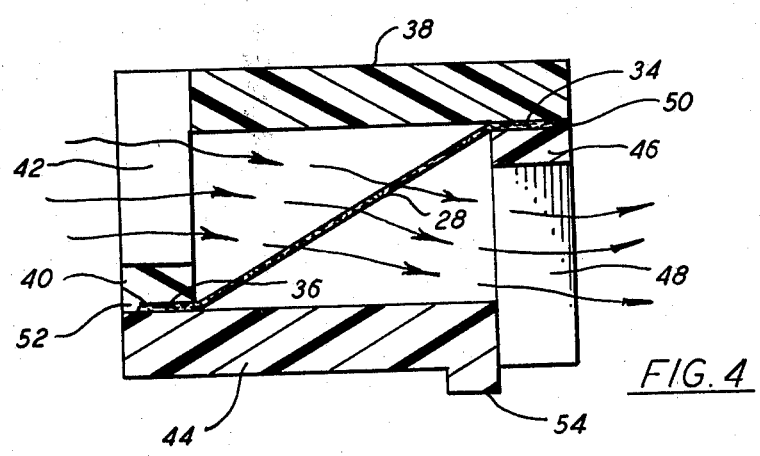

AIR FILTER CARTRIDGE

BACKGROUND OF THE INVENTION

The present invention relates to air filters and, more specifically, to filter cartridge constructions intended for use in fully enclosed portions of computers.

In many modern digital computers information is stored in magnetically coded form on a disc, and is retrieved or "read" from the disc for use in performing computer operations as the disc is rotated within an enclosed housing. In order to insure long life and reliable operation of the discs it is necessary that they be protected from contamination by airborne particles. It is therefore desirable that such particles be substantially removed by filtration from the air in which the disc operates.

A principal object of the present invention is to provide a filter cartridge which is effective to remove airborne contaminants from the air within a fully enclosed portion of a computer containing a rotating disc wherein air flow through the filter media is induced by rotation of the disc.

A further object is to provide a filter cartridge for use in computer applications which is suitable for mass production at relatively low cost.

Another object is to provide a media-containing filter cartridge of unique design adapted for fast and simple mounting and removal in conjunction with a rotating information storage disc within an enclosed housing of a computer.

Other objects will in part be obvious and will in part appear hereinafter.

SUMMARY OF THE INVENTION

In accordance with the foregoing objects, the invention contemplates a filter cartridge having a rigid body initially formed as two separate halves designed for permanent connection in mating relation with a sheet of filter media captured therebetween. The two halves are of similar construction, each including a circular ring and a flat, annular portion joined by a plurality of spaced legs. The legs of one half extend between the ring and the inner periphery of the annular portion and those of the other half between the outer periphery of the annular portion and the ring. The two halves are so dimensioned that when placed in mating relation, the two annular portions are in spaced, parallel planes and the ring of each half provides an opposing surface for the annular portion of the other half.

When the two halves are placed in mating relation, an initially flat, annular piece of filter media is placed therebetween. The inside diameter of the media corresponds approximately to the inside diameters of the two halves of the body portion, and the outside diameter of the media is slightly larger than that of the body portion so that when the two halves are placed in mating arrangement with the media in a conical configuration (i.e., extending diagonally between the inner and outer peripheries of the body portion) the inside and outside diameters of the media and body portion are approximately the same. The inner and outer peripheral portions of the media are firmly engaged between the ring of one half and the opposing surface of the annular portion of the other half, thereby holding the media in a conical configuration.

The two halves of the body portion of the cartridge are permanently joined by cementing, sonic welding, or other convenient means, with the sheet of media securely sealed therebetween. Air may flow radially through the cartridge by passing between the spaced legs at the inner and outer peripheries and through the media. Thus, if the outer, planar surfaces of the two annular portions are placed in sealed engagement with other structure, the only path for air flow is radially through the cartridge and media. The cartridge is so disposed within the housing of the computer wherein it is employed, with a separator plate contacting one side and the disc cartridge the other side. Air flow is induced by rapid rotation of the assembly within the housing in torroidal paths from outside to inside the filter cartridge and around the separator plate and disc cartridge back to the outside of the filter. Thus, contaminants are collected on the filter media and air within the housing is quickly purified after the housing has been opened to replace the disc and/or filter cartridge.

BRIEF DESCRIPTION OF THE DRAWINGS

FIG. 3 is an exploded perspective view of the cartridge; and

FIG. 4 is an enlarged, elevational view in section on the line 4—4 of FIG. 3.

DETAILED DESCRIPTION

Figure 1:
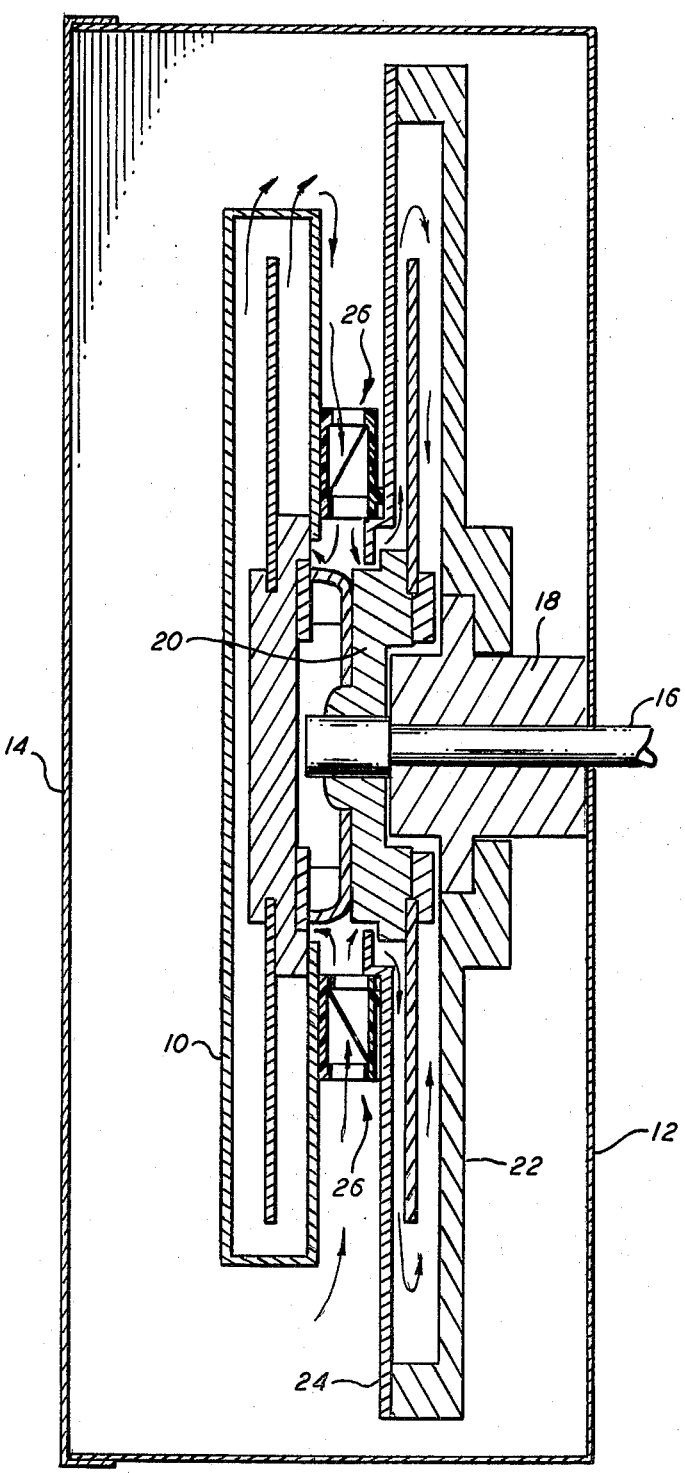
FIG. 1 is an elevational view in half section of the air filter cartridge of the invention shown installed in its intended application.
Figure 2:
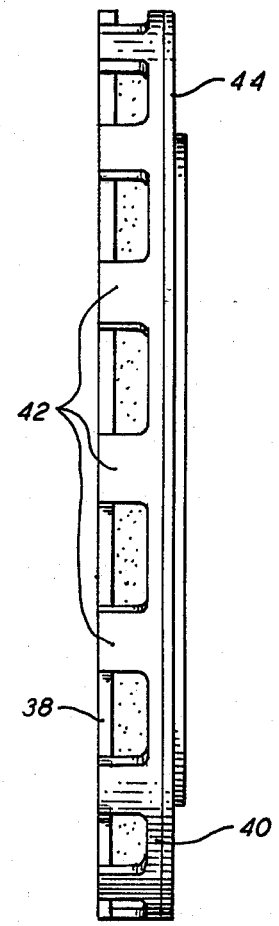
FIG. 2 is a side elevational view of the air filter cartridge.

Referring now to the drawings, in FIG. 1 is shown, somewhat diagrammatically, circular disc cartridge 10, of a type typically used for the storage and retrieval of information in computer systems, mounted in its operating position with housing 12 which is fully enclosed, having a movable side or door 14 for removal and replacement of the discs. Spindle 16 extends in sealed relation through one side of housing 12 and carries hub assembly 18 within the housing. Disc 10 is mounted upon hub assembly 18 by means of suitable cooperative mounting means 20 for rotation within housing 12 as spindle 16 is rotated by appropriate power means (not shown) exteriorly of the housing. Base plate 22 and separator plate 24 are also carried upon and rotated with hub assembly 18. The air filter cartridge of the present invention is designated generally in FIG. 1 by reference numeral 26 and is mounted within housing 12 between disc 10 and separator plate 24. When door 14 is closed, the interior of housing 12 is effectively sealed and there is no passage of air between the inside and outside of the housing although the air within the housing is circulated about therein as the elements are rapidly rotated. It will be understood that the present invention is concerned solely with the air filter cartridge, the other elements being shown to provide a clearer understanding of the operation of the filter cartridge in its intended application.

Filter cartridge 26 includes a single sheet of filter media 28 supported by a body portion formed as two mating halves 30 and 32. Media 28 is initially flat and annular in form, having an open center and inner and outer peripheral portions 34 and 36, respectively. The upper half (as seen in FIG. 3) or part 30 of the body portion is preferably formed as a single piece of moulded plastic material and includes flat, annular portion 38 and ring portion 40 of essentially square cross section joined by a plurality of spaced members or legs 42 extending integrally between the outer periphery of annular portion 38 and the upper surface of ring portion 40. Part 32 likewise includes flat, annular portion 44, ring portion 46 with spaced legs 48 extending between and joining the inner periphery of annular portion 44 and ring portion 46.

Parts 30 and 32 are so dimensioned that the inside diameters of annular portion 38 and ring portion 40 are equal. Thus, the two parts may be brought together with the upper surface of ring portion 46 opposing the inner periphery of the lower surface of annular portion 38, and the lower surface of ring portion 40 opposing the outer periphery of the upper surface of annular portion 44. Filter media 28 is cut with an inner diameter substantially equal to, and an outer diameter slightly greater than, corresponding diameters of the two body portion parts so that the inner and outer diameters of the media and body portion are substantially equal after assembly. The cartridge is assembled by placing the initially flat sheet of filter media between the two body portion halves and bringing the two together in mating relation, thus engaging the outer peripheral portions of the media between ring portion 40 and annular portion 44, and the inner peripheral portion of the media between ring portion 46 and annular portion 38, as seen in FIG. 4. Filter media 28, except for the engaged peripheral portions, is thus held in a generally conical plane.

After the elements have been assembled in the manner indicated in cross section in FIG. 4, they are permanently retained in such relationship by conventional means such as adhesives or sonic welding of the plastic mated parts. For the latter purpose, a slightly raised shoulder 50 may be provided on the surface of ring portion 46 which opposes annular portion 38 in the area where the two parts are to be sonically welded. Raised shoulder 52 is provided on ring portion 40 for the same purpose. Locating ring 54, mounting tabs 56 and notch 58 in one of legs 42 are provided in order to assist in mounting filter cartridge 26 upon the elements associated with the rotating disc cartridge 10 and to provide necessary clearances.

What is claimed is:

1. A filter cartridge for filtering air within an enclosed housing which is caused to circulate in a generally toroidal path by rotation of structure within the housing, said cartridge comprising, in combination:

(a) a rigid body portion having mating halves initially formed as two separate parts;
   (b) a first of said parts having a first, flat, annular portion and a first ring portion joined by a plurality of spaced first legs extending integrally between the outer periphery of said first annular portion and said first ring portion;
   (c) a second of said parts having a second, flat, annular portion and a second ring portion joined by a plurality of spaced second legs extending integrally between the inner periphery of said second annular portion and said second ring portion;
   (d) said first and second parts being so dimensioned that upon being placed together in mating relation, said first ring portion and said second annular portion present a first pair of essentially continuous, opposing surfaces, and said second ring portion and said first annular portion present a second pair of essentially continuous, opposing surfaces;
   (e) an annular sheet of filter media engaged about its outer periphery between said first pair of opposing surfaces and about its inner periphery between said second pair of opposing surfaces; and
   (f) means permanently joining said first and second parts with said media continuously engaged therebetween at both its inner and outer peripheries, whereby air passing between the inside and outside of the annulus formed by said cartridge passes through said media and between said legs of said first and second parts.

2. The invention according to claim 1 wherein said media is an annular blank cut from a planar sheet of material.

3. The invention according to claims 1 or 2 wherein said media inner and outer peripheries are engaged between said first and second pairs of opposing surfaces to hold the portion of said media intermediate of said engaged peripheries in a generally conical plane.

4. The invention according to claims 1 or 2 wherein said media inner and outer peripheries are held between said first and second pairs of opposing surfaces in substantially parallel planes.

5. The invention according to claims 1 or 2 wherein said media inner and outer peripheries are engaged between said first and second pairs of opposing surfaces in substantially parallel planes with the portion of said media intermediate of said engaged peripheries in a generally conical plane having a central axis normal to said parallel planes.

* * * * *